United States Patent
Aslam et al.

(10) Patent No.: US 9,923,726 B2
(45) Date of Patent: Mar. 20, 2018

(54) RDMA TRANSFERS IN MAPREDUCE FRAMEWORKS

(71) Applicant: International Business Machines Corporation, Armonk, NY (US)

(72) Inventors: Muhammad Sohaib Aslam, Ajax (CA); Tiia J. Salo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 14/559,266

(22) Filed: Dec. 3, 2014

(65) Prior Publication Data

US 2016/0162437 A1   Jun. 9, 2016

(51) Int. Cl.
   *G06F 15/16*   (2006.01)
   *H04L 12/06*   (2006.01)
   *G06F 9/50*    (2006.01)

(52) U.S. Cl.
   CPC ............ *H04L 12/06* (2013.01); *G06F 9/5066* (2013.01)

(58) Field of Classification Search
   CPC ........ H04L 12/06; H04L 12/00; G06F 9/5066
   USPC ....................................................... 709/219
   See application file for complete search history.

(56) References Cited

U.S. PATENT DOCUMENTS

| | | | | |
|---|---|---|---|---|
| 2004/0255055 A1* | 12/2004 | Lamberts | ................ | G11B 5/09 710/5 |
| 2009/0157995 A1* | 6/2009 | Kalmuk | .................. | G06F 13/28 711/170 |
| 2011/0145358 A1* | 6/2011 | Landau | ................ | G06F 9/44563 709/214 |
| 2013/0318084 A1 | 11/2013 | Dalal | | |
| 2014/0047095 A1* | 2/2014 | Breternitz | ............. | G06F 9/5072 709/224 |
| 2014/0081918 A1* | 3/2014 | Srivas | ................. | G06F 17/3007 707/639 |
| 2014/0358869 A1* | 12/2014 | Kim | ...................... | G06F 9/5066 707/692 |
| 2014/0359624 A1* | 12/2014 | Cherkasova | ........ | G06F 11/3404 718/100 |
| 2014/0372438 A1* | 12/2014 | Chandramouli | .. | G06F 17/30598 707/737 |

OTHER PUBLICATIONS

Docan, Ciprian, "Enabling Dynamic Interactions in Large Scale Applications and Scientific Workflows Using Semantically Specialized Shared Dataspaces", A dissertation submitted to the Graduate School—New Brunswick, Rutgers, The State University of New Jersey, Oct. 2011, pp. i-127.
Zhang et al., "Clustering Social Images with MapReduce and High Performance Collective Communication", HPDC '13 New York City, USA, Copyright 2013 ACM.

* cited by examiner

*Primary Examiner* — Nicholas Taylor
*Assistant Examiner* — Meng Vang
(74) *Attorney, Agent, or Firm* — Alexander G. Jochym; Noah A. Sharkan

(57) ABSTRACT

Embodiments of the present invention provide methods, systems, and computer program products for transferring data in a MapReduce framework. In one embodiment, MapReduce jobs are performed such that data spills are stored by mapper systems in memory and are transferred to reducer systems via one-sided RDMA transfers, which can reduce CPU overhead of mapper systems and the latency of data transfer to reducer systems.

12 Claims, 4 Drawing Sheets

… (1) …

RDMA TRANSFERS IN MAPREDUCE FRAMEWORKS

BACKGROUND OF THE INVENTION

The present invention relates generally to the field of MapReduce frameworks, and more particularly to management of data spills in MapReduce frameworks.

MapReduce frameworks provide the ability to process large data sets in a distributed fashion using a cluster of multiple computing nodes. In a typical MapReduce framework implementation, a plurality of mappers are each assigned a portion of data (i.e., a split) from the data set on which to perform one or more tasks (e.g., executing a map script to count occurrences of each word in a string). The output results of each mapper are sorted (e.g., shuffling the output results such that results pertaining to the same words are grouped together) and assigned to reducers, which in turn perform one or more reduce tasks (e.g., executing a reduce script to sum all occurrence values for each word). Accordingly, the MapReduce framework not only allows large data sets to be split between many mappers and reducers, but such mappers and reducers can each perform their respective tasks simultaneously, which can greatly improve the speed and efficiency with which processing jobs can be completed.

Typically, each mapper writes its output results to a memory buffer of finite size (e.g., 100 MB). When the buffer is full, contents of the buffer are spilled to a local disk in a spill file, after which additional output results can be written to the buffer. After a mapper has written its last output result, the spill files are merged and sorted into a single output file, which can be transmitted to an assigned reducer via TCP/IP.

SUMMARY

Embodiments of the present invention provide methods, systems, and computer program products for transferring data in a MapReduce framework. In one embodiment, one or more computer processors receive a data split assigned to a mapper system. A first fixed-address memory region is registered for the mapper system, and one or more mapper tasks are executed on the data split to generate output results. Generated output results are spilled to the first fixed-address memory region, and generated output results are transferred from the first fixed-address memory region to a reducer system using remote direct memory access (RDMA).

DETAILED DESCRIPTION

Embodiments of the present invention recognize that in a typical MapReduce framework implementation, mapper systems store data spills to disk and transfer data spills to reducers via TCP/IP and HTTP, which can result in decreased transfer speeds and performance. Embodiments of the present invention provide methods, systems, and computer program products for transferring data in a MapReduce framework in which data spills are stored by mapper systems in memory and are transferred to reducer systems via one-sided RDMA transfers, which can reduce CPU overhead of mapper systems and the latency of data transfer to reducer systems, and can improve performance of MapReduce jobs.

Figure 1:
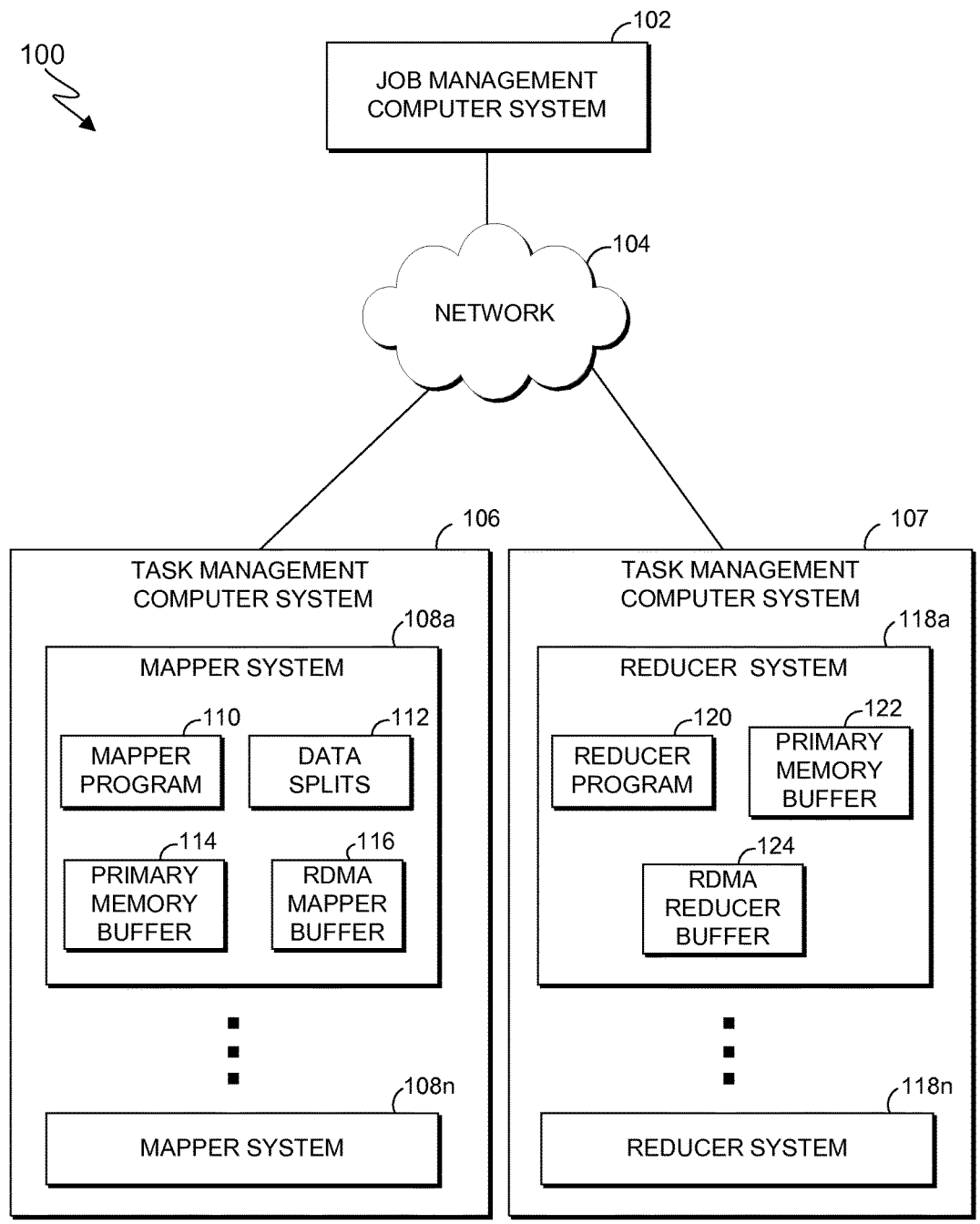
FIG. 1 is a block diagram of a backup system, in accordance with an embodiment of the present invention.

FIG. 1 is a functional block diagram of MapReduce system 100, in accordance with an embodiment of the present invention. MapReduce system 100 includes job management computer system 102, task management computer system 106, and task management computer system 107, all interconnected over network 104. Job management computer system 102, task management computer system 106, and task management computer system 107 can be desktop computers, laptop computers, specialized computer servers, or any other computer systems known in the art. In certain embodiments, job management computer system 102, task management computer system 106, and task management computer system 107 represent computer systems utilizing clustered computers and components to act as a single pool of seamless resources when accessed through network 104. For example, such embodiments may be used in data center and cloud computing applications. In certain embodiments, job management computer system 102, task management computer system 106, and task management computer system 107 represent virtual machines. In general, job management computer system 102, task management computer system 106, and task management computer system 107 are representative of any electronic devices, or combination of electronic devices, capable of executing machine-readable program instructions, as described in greater detail with regard to FIG. 4.

Job management computer system 102 receives processing jobs from one or more applications and distributes tasks for those processing jobs to task management computer system 106 and task management computer system 107. For illustrative purposes, MapReduce system 100 is depicted in FIG. 1 as having a single job management computer system 102 and two task management computer systems 106 and 107; however, it should be understood that MapReduce system 100 can comprise a cluster of any number of computing nodes that can serve as job management computer systems (e.g., JobTrackers) and any number of computing nodes that can serve as task management computer systems (e.g., TaskTrackers).

Task management computer system 106 includes mapper systems 108a-n. In this embodiment, mapper systems 108a-n each represent a Java Virtual Machine (JVM), and task management computer system 106 can instantiate one such JVM for each assigned task. Mapper systems 108a-n can be hosted locally on task management computer system 106 and/or can be remotely hosted on one or more other computer system accessible via network 104. In other embodiments, other types of virtual machines and/or hardware systems can be used to implement mapper systems 108a-n. For illustrative purposes, embodiments of the present invention may hereafter be discussed with respect to mapper system 108a, it being understood that, unless explicitly stated otherwise, the following discussion also applies to any of mapper systems 108b-n, depending on which of those mapper systems are assigned to one or more tasks.

Mapper systems 108a-n each include mapper program 110, data splits 112, primary memory buffer 114, and remote direct memory access (RDMA) mapper buffer 116. Job management computer system 102 provides assigned mapper systems 108a-n with respective data splits of the larger data set to be processed in the processing job. Mapper program 110 processes data splits 112 assigned by job management computer system 102 to execute one or more mapper tasks and output results. In this embodiment, data splits 112 are retrieved and stored locally on mapper system 108a, such as using one or more hard disk drives.

Primary memory buffer 114 is a memory buffer in which mapper program 110 stores output results of executed mapper tasks. When primary memory buffer 114 is full, the output results are written to RDMA mapper buffer 116. Stated differently, mapper program 110 spills output results to RDMA mapper buffer 116, rather than to disk. In another embodiment, primary memory buffer 114 and RDMA mapper buffer 116 can be implemented as a single memory buffer.

RDMA mapper buffer 116 is a fixed-address memory region expressed as a fixed memory address and a specified byte range following the fixed memory address (i.e., a locked memory region that cannot be swapped by the operating system). In this embodiment, RDMA mapper buffer 116 is off-JVM heap (i.e., separate from dynamic memory used by the JVM) and RDMA mapper buffer 116 is sized such that it can store all output results of mapper system 108a for the assigned tasks. Stated differently, RDMA mapper buffer 116 is sufficiently large such that no spilt data will be written to disk. In this embodiment, multiple RDMA mapper buffers 116 can be created to achieve various configurations. For example, as discussed in greater detail later in this specification, one RDMA mapper buffer 116 can be created for each of reducer systems 118a-n that are assigned to mapper system 108a (i.e., dedicated buffers), and/or RDMA mapper buffers 116 can be shared by multiple mapper systems 108a-n that are assigned to common reducer systems 118a-n (i.e., shared and reused buffers).

Task management computer system 107 includes reducer systems 118a-n. As previously discussed with regard to mapper systems 108a-n, in this embodiment, reducer systems 118a-n each represent a JVM, and task management computer system 107 can instantiate one such JVM for each assigned task. Reducer systems 118a-n can be hosted locally on task management computer system 107 and/or can be remotely hosted on one or more other computer system accessible via network 104. In other embodiments, other types of virtual machines and/or hardware systems can be used to implement reducer systems 118a-n. For illustrative purposes, embodiments of the present invention may hereafter be discussed with respect to reducer system 118a, it being understood that, unless explicitly stated otherwise, the following discussion also applies to any of reducer systems 118b-n, depending on which of those reducer systems are assigned to one or more tasks.

Reducer systems 118a-n each include reducer program 120, primary memory buffer 122, and RDMA reducer buffer 124. Each of reducer systems 118a-n is assigned to one or more of mapper systems 108a-n by job management computer system 102. Reducer systems 118a-n receive output results (e.g., partitions of data) from one or more mapper systems 108a-n to which they are assigned, and perform one or more reducer tasks on those output results. Again, for illustrative purposes, embodiments of the present invention may hereafter be discussed with respect to reducer system 118a, it being understood that, unless explicitly stated otherwise, the following discussion also applies to any of reducer systems 118b-n, depending on which of those reducer systems are assigned.

Reducer program 120 of reducer system 118a processes output results (e.g., data partitions) generated by mapper systems 108a-n to which reducer system 118a is assigned, to merge the output results and execute one or more reducer tasks on the merged output results.

Primary memory buffer 122 is a dynamic memory buffer used by reducer system 118a to store merged output results generated by mapper systems 108a-n to which reducer system 118a is assigned. For example, primary memory buffer 122 can be a JVM heap.

RDMA reducer buffer 124 is a fixed-address memory region expressed as a fixed memory address and a specified byte range following the fixed memory address (i.e., a locked memory region). RDMA reducer buffer 124 is used by reducer system 118a to receive and store output results generated by mapper systems 108a-n to which reducer system 118a is assigned, prior to merging and storing those results in primary memory buffer 122. In this embodiment, RDMA reducer buffer 124 is off-JVM heap (i.e., separate from dynamic memory used by the JVM, such as primary memory buffer 122), and RDMA reducer buffer 124 is sized such that it can store all output files received from assigned mapper systems 108a-n.

Reducer program 120 performs one-sided RDMA transfers of data from RDMA mapper buffer 116 to RDMA reducer buffer 124. In one embodiment, RDMA transfers are performed using InfiniBand technology over network 104. In another embodiment, RDMA transfers are performed using RDMA over converged Ethernet (RoCE) technology over network 104. In general, any suitable RDMA transfer technology known in the art can be used.

Network 104 can be, for example, a local area network (LAN), a wide area network (WAN) such as the Internet, or a combination of the two, and include wired, wireless, or fiber optic connections. In general, network 104 can use any combination of connections and protocols that will support communications between job management computer system 102, mapper systems 108a-n, and reducer systems 118a-n, including RDMA transfers, in accordance with a desired embodiment of the invention.

Figure 2:
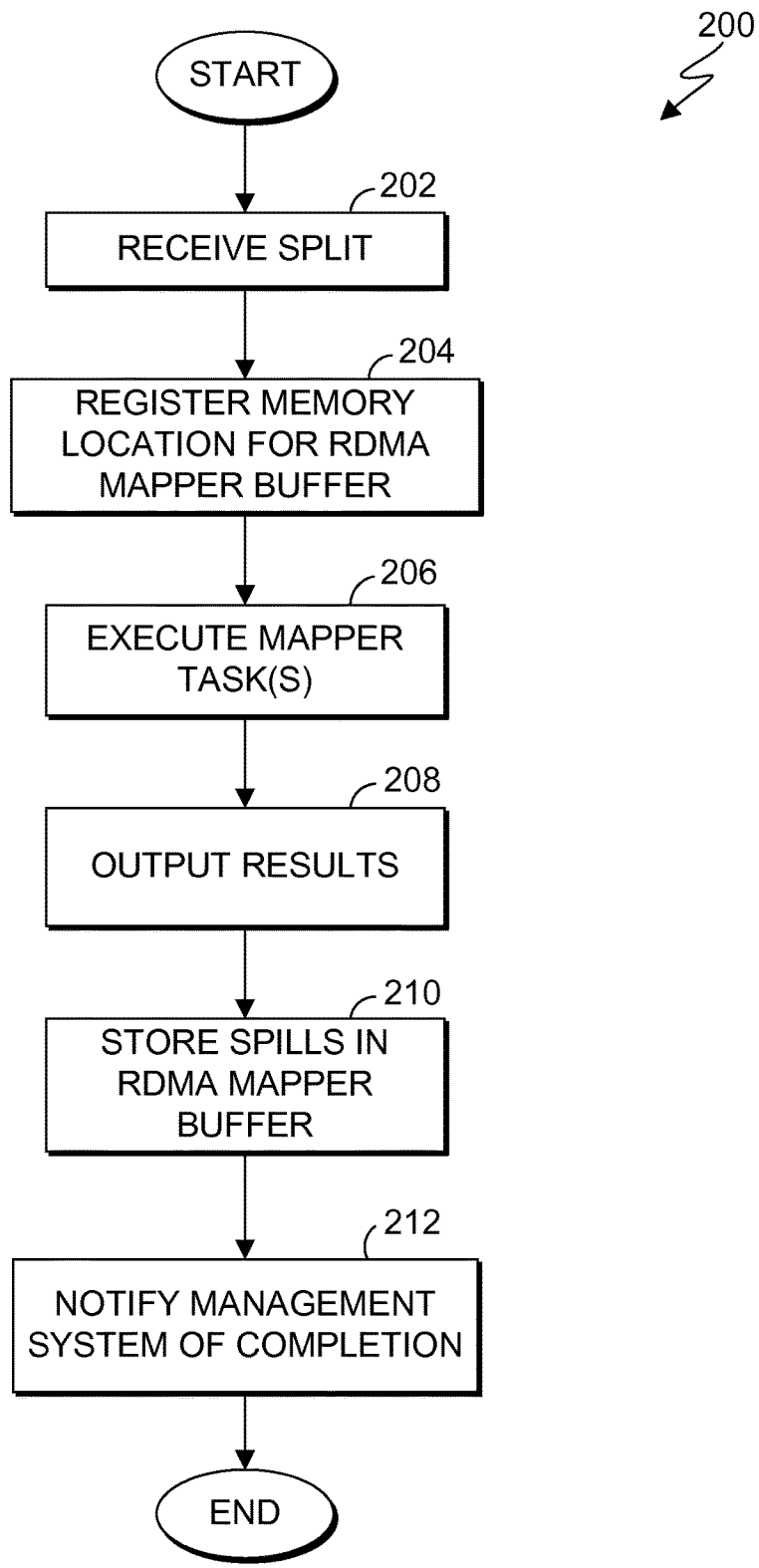
FIG. 2 is a flowchart illustrating operations of a mapper system in a MapReduce framework, in accordance with an embodiment of the present invention.

FIG. 2 is a flowchart illustrating operations of a mapper system, in accordance with an embodiment of the present invention. For illustrative purposes, the following discussion will be made with respect to mapper system 108a.

Mapper program 110 receives a data split of a larger data set to be processed by mapper program 110 for the assigned task (operation 202). In this embodiment, mapper program 110 receives the data split from job management computer system 102 and stores the data split locally on mapper system 108a.

Mapper program 110 registers a memory region to be used for an RDMA mapper buffer (operation 204). In this embodiment, mapper program 110 registers a memory region expressed by a fixed memory address and a specified byte range following the fixed memory address (i.e., a locked memory region) that is off-JVM heap or otherwise separate from dynamic memory regions used by mapper system 108a. The RDMA mapper buffer may, however, be located on the same one or more computer readable storage media as dynamic memory regions. In this embodiment, RDMA mapper buffers are sized such that no spilt data will be written to disk. Accordingly, mapper program 110 can determine a size for the RDMA mapper buffer to be created based on an anticipated amount of spilt data (e.g., size and number of spill files historically created for similar tasks).

The number of RDMA mapper buffers that are created can be configured based on various considerations, such as the number of reducer systems assigned for a processing job and/or the number of mapper systems that are assigned to a particular reducer system. For example, where there are multiple mapper systems hosted on a single machine that are assigned to a particular reducer system, mapper program 110 may create one or more RDMA mapper buffers to be shared by those multiple mapper systems. Where there are a fewer number of mapper systems assigned to a particular reducer system, mapper program 110 may create RDMA mapper buffers dedicated for use by certain mapper systems.

Mapper program 110 executes one or more mapper tasks on the received data split (operation 206). In this embodiment, mapper program 110 executes one or more mapper tasks specified by mapper code (e.g., a mapper script). For example, mapper code may be executed to count occurrences of words or phrases within the data split.

Mapper program 110 outputs results of executing the one or more mapper tasks on the received data split (operation 208). In this embodiment, mapper program 110 outputs and writes results to primary memory buffer 114. After primary memory buffer 114 becomes full, mapper program 110 spills the output results to the RDMA mapper buffer (operation 210); mapper program 110 does not spill data to disk. In this embodiment, the output results are divided into partitions corresponding to assigned reducer systems to which the output results should be sent, as specified by job management computer system 102.

After outputting all results for the received data split, mapper program 110 notifies job management computer system 102 that processing of the data split has been completed (operation 212). In this embodiment, mapper program 110 notifies job management computer system 102 by transmitting a ready-to-read signal and an RDMA descriptor to job management computer system 102 via network 104. The RDMA descriptor contains the fixed memory address and byte range of the RDMA mapper buffer, along with a unique key to access the RDMA mapper buffer remotely.

The operations of FIG. 2 can be repeated for each data split received by each assigned mapper system of MapReduce system 100. Accordingly, output results generated by mapper systems can be stored without having to spill data to disk and in a manner that facilitates RDMA transfer to assigned reducer systems.

Figure 3:
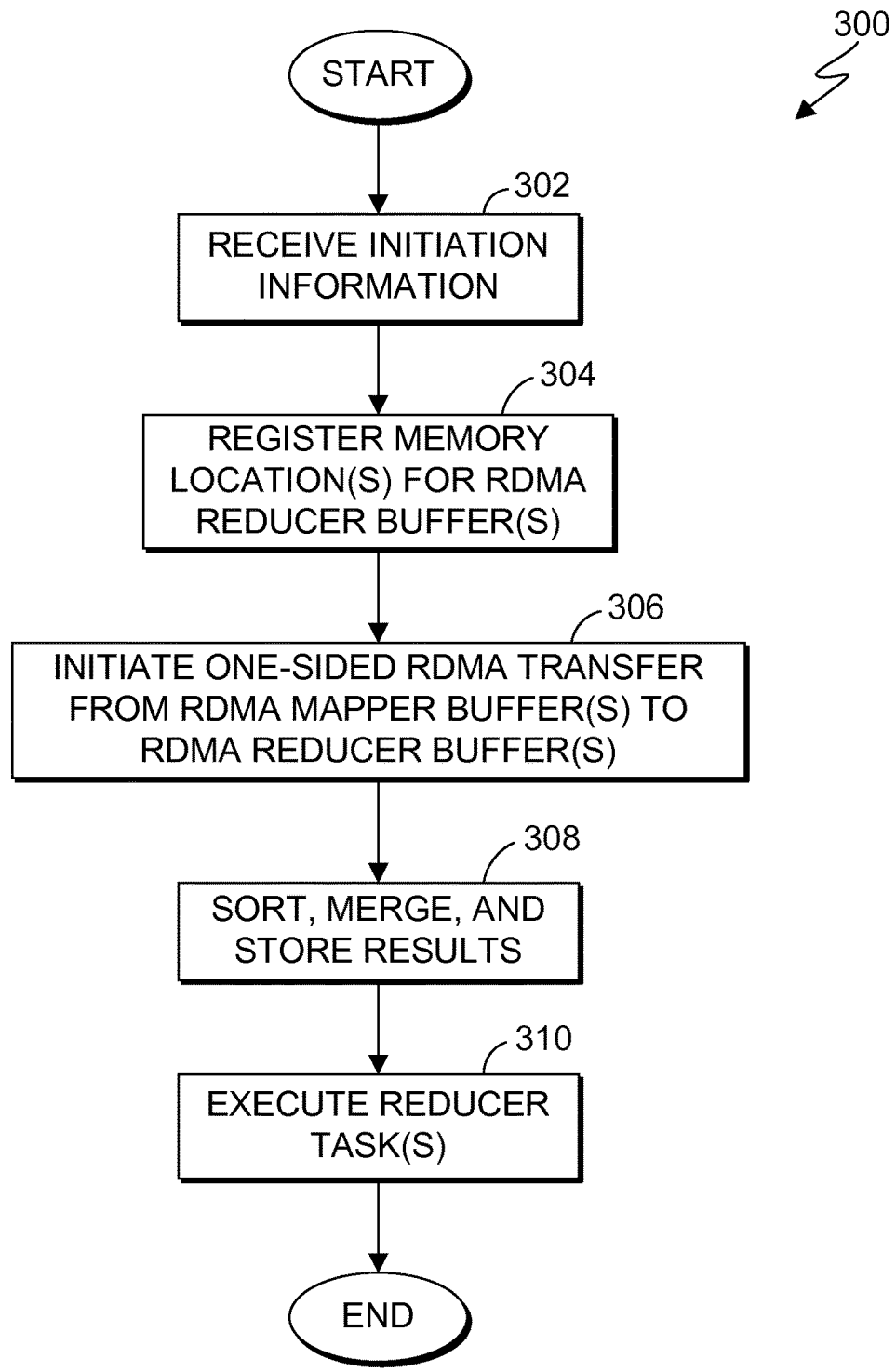
FIG. 3 is a flowchart illustrating operations of a reducer system in a MapReduce framework, in accordance with an embodiment.

FIG. 3 is a flowchart illustrating operations of a reducer system, in accordance with an embodiment of the present invention. For illustrative purposes, the following discussion is made with respect to reducer system 118a.

Reducer program 120 receives initiation information from job management computer system 102 (operation 302). In this embodiment, such initiation information includes a job identifier (e.g., a unique number that identifies the job to which the assigned task belongs), an identifier of the one or more mapper systems to which it is assigned (e.g., mapper system 108a), and RDMA descriptors to be used for RDMA transfer of output results stored in RDMA mapper buffers (e.g., RDMA mapper buffer 116) of mapper systems 108a-n to which the reducer system is assigned.

Reducer program 120 registers a memory region to be used for an RDMA reducer buffer (operation 304). In this embodiment, reducer program 120 registers a fixed-address memory region, expressed as a fixed memory address and a specified byte range following the fixed memory address (i.e., a locked memory region), that is off-JVM heap or otherwise separate from dynamic memory regions used by reducer system 118a. The RDMA reducer buffer may, however, be located on the same one or more computer readable storage media as dynamic memory regions. In this embodiment, RDMA reducer buffers are sized such that no data must be spilled to disk. Accordingly, reducer program 120 can determine a size for the RDMA reducer buffer to be created based on the sizes of RDMA mapper buffers of mapper systems (e.g., RDMA mapper buffer 116 of mapper system 108a) to which reducer system 118a is assigned.

Reducer program 120 initiates one-sided RDMA transfer of output results from RDMA mapper buffer 116 to RDMA reducer buffer 124 via network 104 (operation 306). In this embodiment, RDMA transfer of the data is performed using known RDMA transfer technologies, such as InfiniBand and/or RoCE.

Reducer program 120 sorts, merges, and stores results received from mapper system 108a in primary memory buffer 122 (operation 308). In one embodiment, reducer program 120 copies output results from RDMA reducer buffer 124 to primary memory buffer 122, and sorts the output results in primary memory buffer 122. In another embodiment, reducer program 120 sorts output results in RDMA reducer buffer 124, and then stores the sorted output results in primary memory buffer 122.

Reducer program 120 executes one or more reducer tasks on the sorted output results stored in primary memory buffer 122 (operation 310). In this embodiment, reducer program 120 executes one or more reducer tasks specified by reducer code (e.g., a reducer script). For example, reducer code may be executed to total all counts of occurrences of words or phrases within the data split.

The operations of FIG. 3 can be repeated for each partition and each assigned reducer system of MapReduce system 100. Accordingly, embodiments of the present invention can be used to perform MapReduce jobs using direct memory-to-memory transfer of spilt data from mappers to reducers, thereby improving the speed and efficiency with which the MapReduce jobs are performed.

Figure 4:
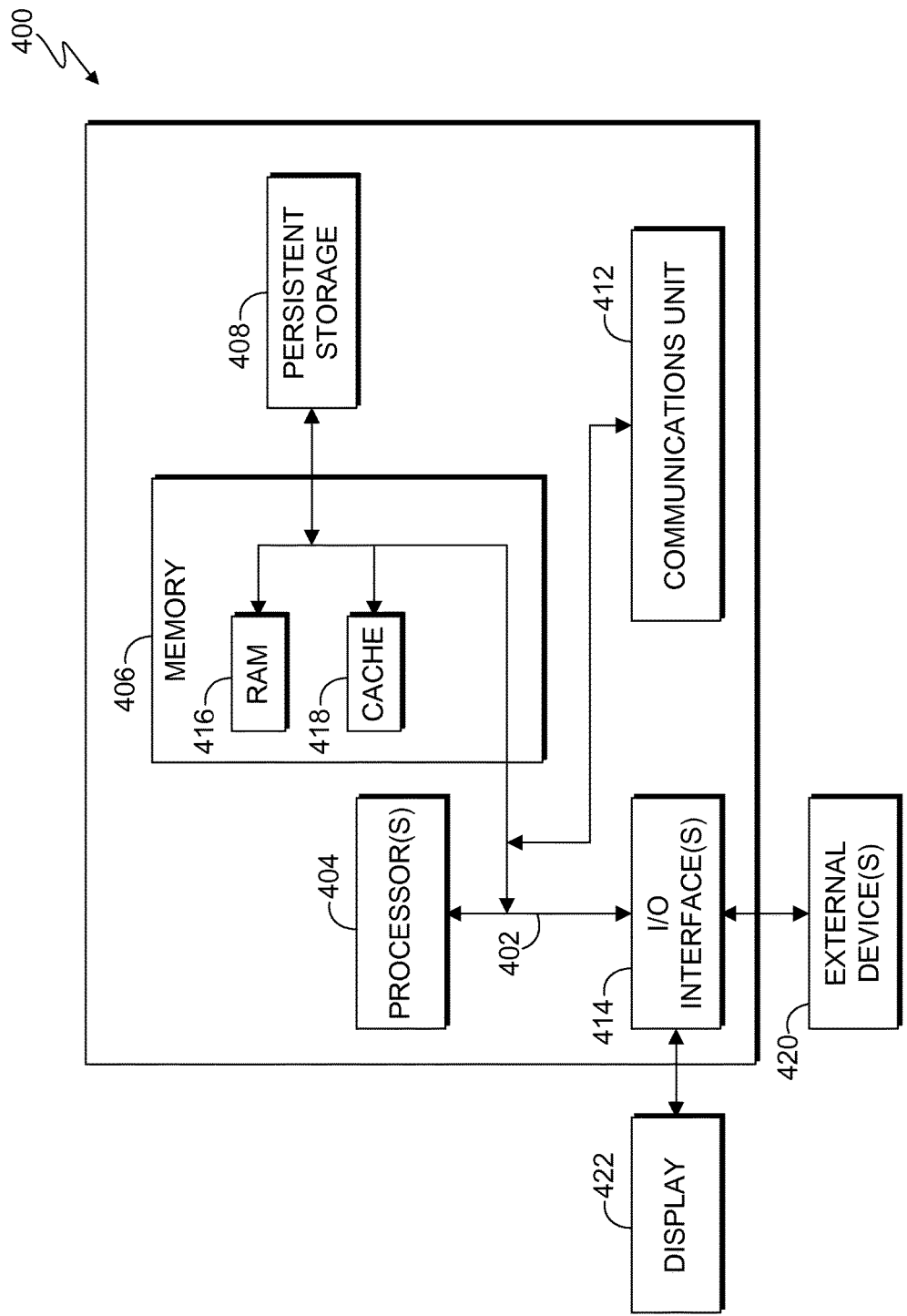
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 104). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to job management computer system 102, task management computer system 106, and task management computer system 107 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for transferring data in a MapReduce framework comprising a mapper system and a reducer system, the method comprising:
   receiving, by one or more computer processors, a data split assigned to a mapper system;
   registering, by one or more computer processors, a first fixed-address memory region for the mapper system to be used for a remote direct memory access (RDMA) reducer buffer, wherein the first fixed-address memory region is a locked memory region, expressed as a fixed memory address followed by a specified byte range, that is separated from dynamic memory regions on a virtual machine used by the mapper system, and wherein registering includes determining a size for the RDMA reducer buffer to be created based on a size of an RDMA mapper buffer of the mapper system to which the reducer system is assigned, wherein the RDMA reducer buffer is sized such that no data is spilled to disk;
   executing, by one or more computer processors, one or more mapper tasks on the data split to generate output results;
   spilling, by one or more computer processors, generated output results to the first fixed-address memory region, such that no data is spilled to disk;
   transferring, by one or more computer processors, generated output results from the first fixed-address memory region to the reducer system using RDMA, wherein transferring includes performing an RDMA transfer of generated output results from the first fixed-address memory region to a second fixed-address memory region;
   sorting, by one or more computer processors, the output results in the second fixed-address memory region; and
   transferring, by one or more computer processors, the sorted output results from the second fixed-address memory region to a primary memory buffer, such that no data is spilled to disk.

2. The method of claim 1, further comprising:
   registering, by one or more computer processors, the second fixed-address memory region for the reducer system.

3. The method of claim 1, wherein the RDMA transfer is performed using both InfiniBand and RDMA over Converged Ethernet (RoCE).

4. The method of claim 1, further comprising:
   transferring, by one or more computer processors, the generated output results from the second fixed-address memory region to a dynamic memory region; and
   sorting, by one or more computer processors, the generated output results in the dynamic memory region.

5. A computer program product for transferring data in a MapReduce framework comprising a mapper system and a reducer system, the computer program product comprising:
   one or more computer readable storage memory and program instructions stored on the one or more computer readable storage memory, the program instructions comprising:
   program instructions to receive a data split assigned to a mapper system;
   program instructions to register a first fixed-address memory region for the mapper system to be used for a remote direct memory access (RDMA) reducer buffer, wherein the first fixed-address memory region is a locked memory region, expressed as a fixed memory address followed by a specified byte range, that is separated from dynamic memory regions on a virtual machine used by the mapper system, and wherein registering includes determining a size for the RDMA reducer buffer to be created based on a size of an RDMA mapper buffer of the mapper system to which the reducer system is assigned, wherein the RDMA reducer buffer is sized such that no data is spilled to disk;

program instructions to execute one or more mapper tasks on the data split to generate output results;

program instructions to spill generated output results to the first fixed-address memory region, such that no data is spilled to disk;

program instructions to transfer generated output results from the first fixed-address memory region to the reducer system using RDMA, wherein transferring includes performing an RDMA transfer of generated output results from the first fixed-address memory region to a second fixed-address memory region;

sorting, by one or more computer processors, the output results in the second fixed-address memory region; and transferring, by one or more computer processors, the sorted output results from the second fixed-address memory region to a primary memory buffer.

6. The computer program product of claim 5, wherein the program instructions stored on the one or more computer readable storage memory further comprise:

program instructions to register a second fixed-address memory region for the reducer system.

7. The computer program product of claim 5, wherein the RDMA transfer is performed using both InfiniBand and RDMA over Converged Ethernet (RoCE).

8. The computer program product of claim 5, wherein the program instructions stored on the one or more computer readable storage memory further comprise:

program instructions to transfer the generated output results from the second fixed-address memory region to a dynamic memory region; and program instructions to sort the generated output results in the dynamic memory region.

9. A computer system for transferring data in a MapReduce framework comprising a mapper system and a reducer system, the computer system comprising:

one or more computer processors;

one or more computer readable storage memory;

program instructions stored on the one or more computer readable storage memory for execution by at least one of the one or more processors, the program instructions comprising:

program instructions to receive a data split assigned to a mapper system;

program instructions to register a first fixed-address memory region for the mapper system to be used for a remote direct memory access (RDMA) reducer buffer, wherein the first fixed-address memory region is a locked memory region, expressed as a fixed memory address followed by a specified byte range, that is separated from dynamic memory regions on a virtual machine used by the mapper system, and wherein registering includes determining a size for the RDMA reducer buffer to be created based on a size of an RDMA mapper buffer of the mapper system to which the reducer system is assigned, wherein the RDMA reducer buffer is sized such that no data is spilled to disk;

program instructions to execute one or more mapper tasks on the data split to generate output results;

program instructions to spill generated output results to the first fixed-address memory region, such that no data is spilled to disk;

program instructions to transfer generated output results from the first fixed-address memory region to the reducer system using RDMA, wherein transferring includes performing an RDMA transfer of generated output results from the first fixed-address memory region to a second fixed-address memory region;

sorting, by one or more computer processors, the output results in the second fixed-address memory region; and transferring, by one or more computer processors, the sorted output results from the second fixed-address memory region to a primary memory buffer.

10. The computer system of claim 9, wherein the program instructions stored on the one or more computer readable storage memory further comprise:

program instructions to register a second fixed-address memory region for the reducer system.

11. The computer system of claim 9, wherein the RDMA transfer is performed using both InfiniBand and RDMA over Converged Ethernet (RoCE).

12. The computer system of claim 9, wherein the program instructions stored on the one or more computer readable storage memory further comprise:

program instructions to transfer the generated output results from the second fixed-address memory region to a dynamic memory region; and program instructions to sort the generated output results in the dynamic memory region.

* * * * *